Feb. 8, 1938.  W. D. HARPER  2,107,984
AUTOMATIC BRAKE OPERATOR
Filed March 28, 1936   8 Sheets-Sheet 1
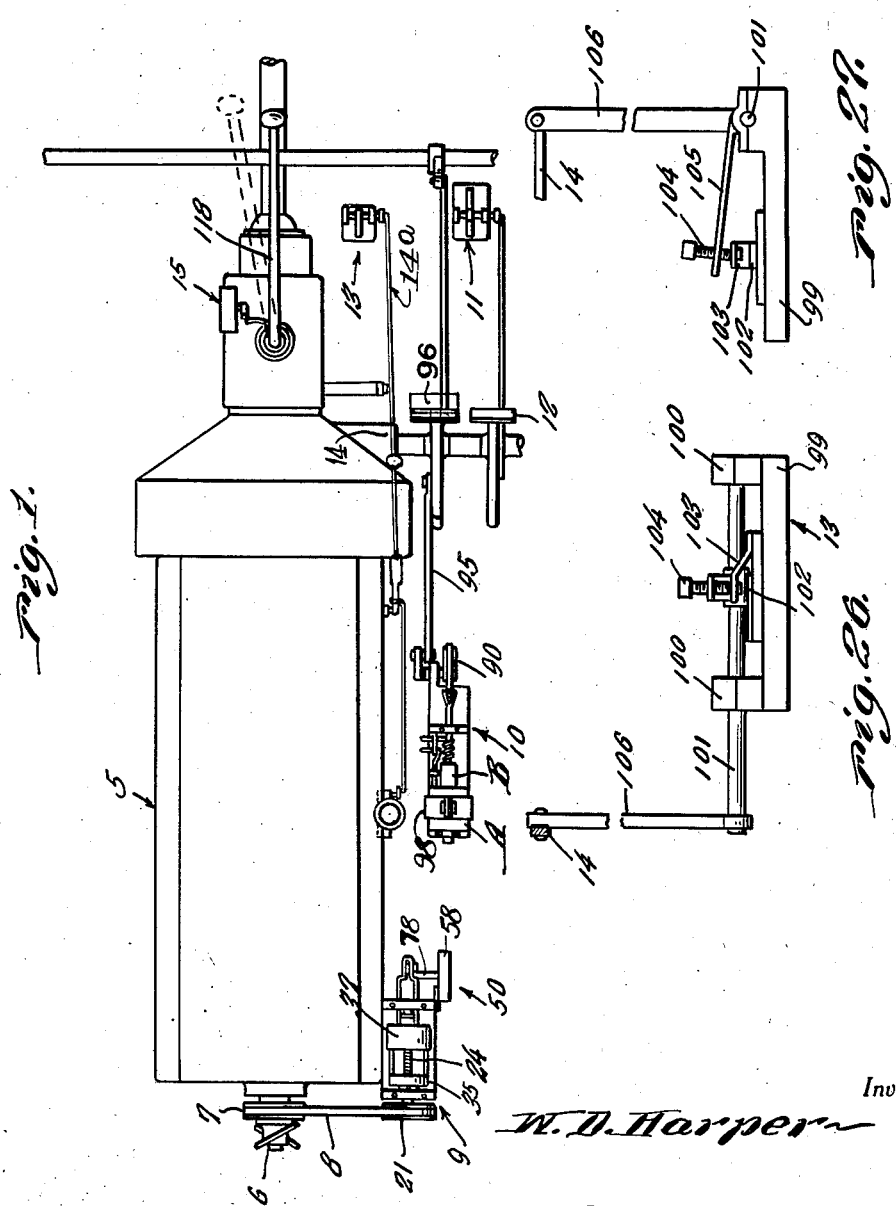
Inventor
W. D. Harper
By Clarence A. O'Brien and
Hyman Berman
Attorneys Feb. 8, 1938.  W. D. HARPER  2,107,984
AUTOMATIC BRAKE OPERATOR
Filed March 28, 1936   8 Sheets-Sheet 2
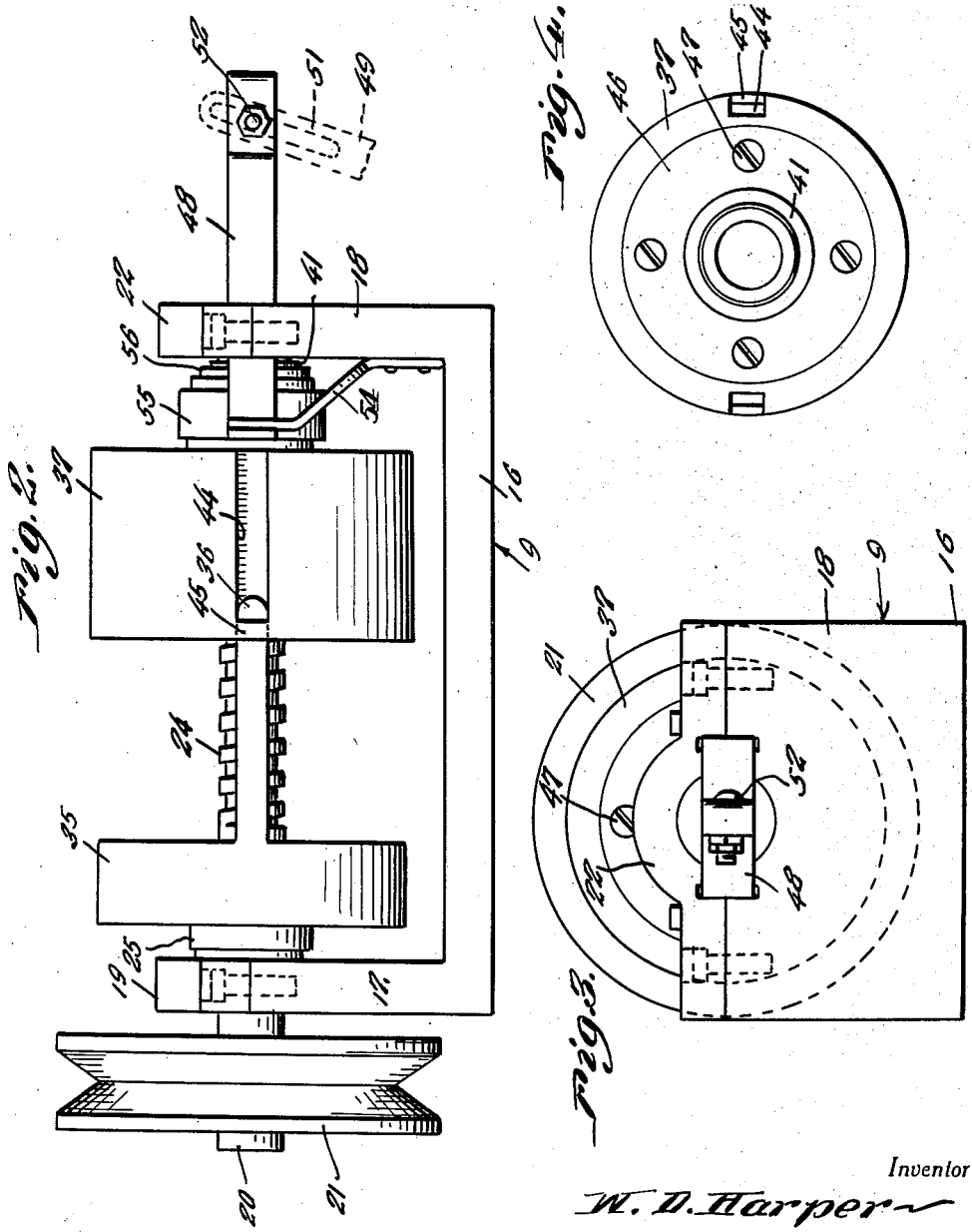
Inventor
W. D. Harper
By Clarence A. O'Brien and
Hyman Berman
Attorneys Feb. 8, 1938.  W. D. HARPER  2,107,984
AUTOMATIC BRAKE OPERATOR
Filed March 28, 1936    8 Sheets-Sheet 3
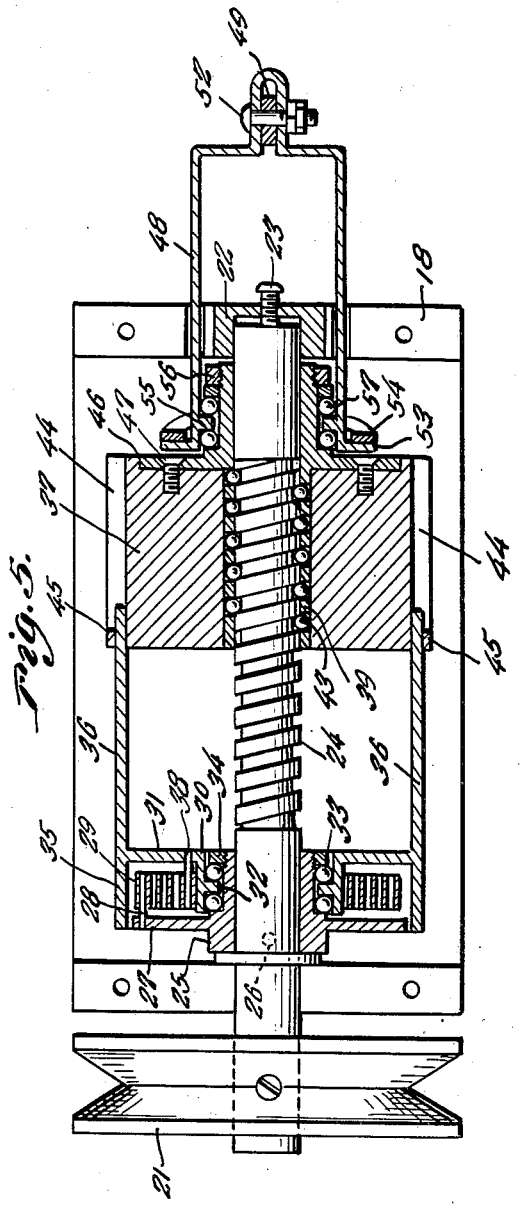
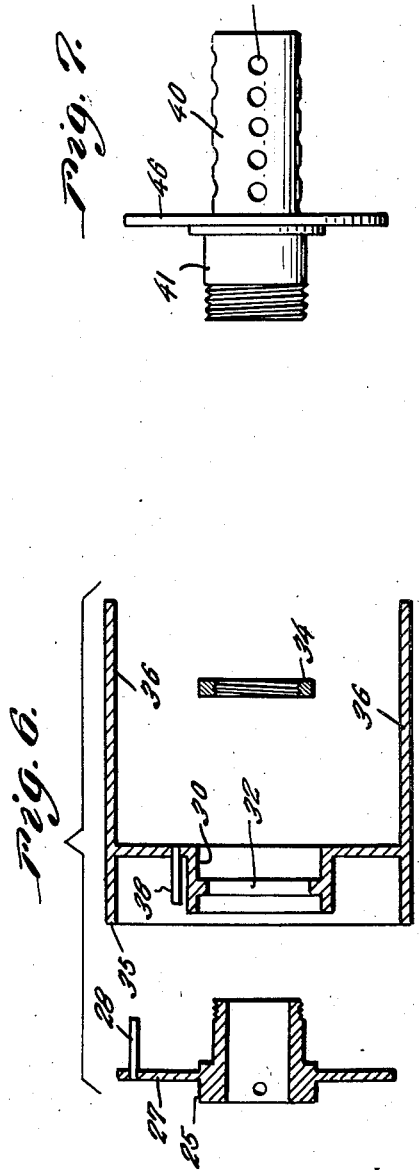
Inventor
W. D. Harper
By Clarence A. O'Brien and
Hyman Berman
Attorneys

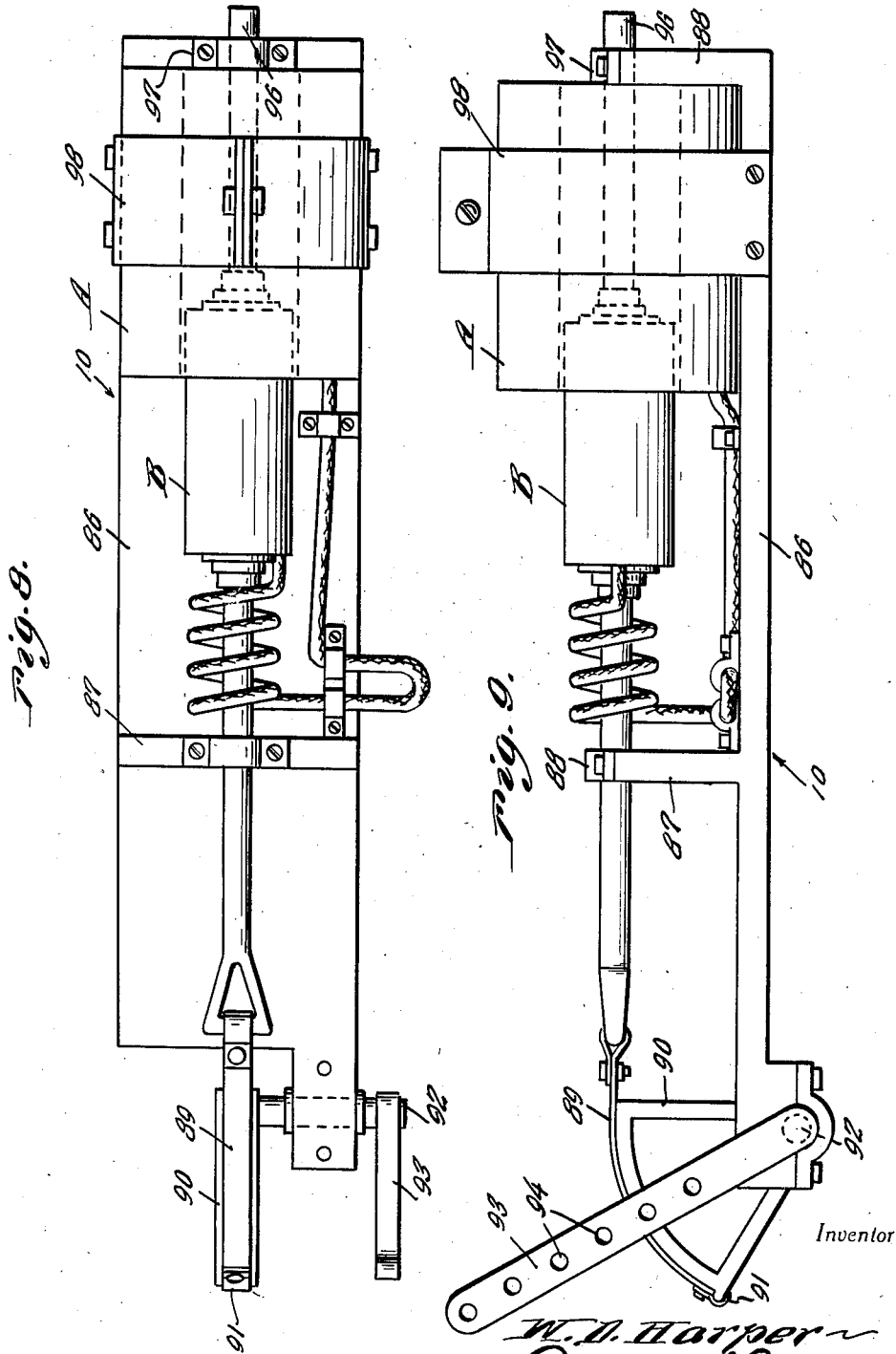

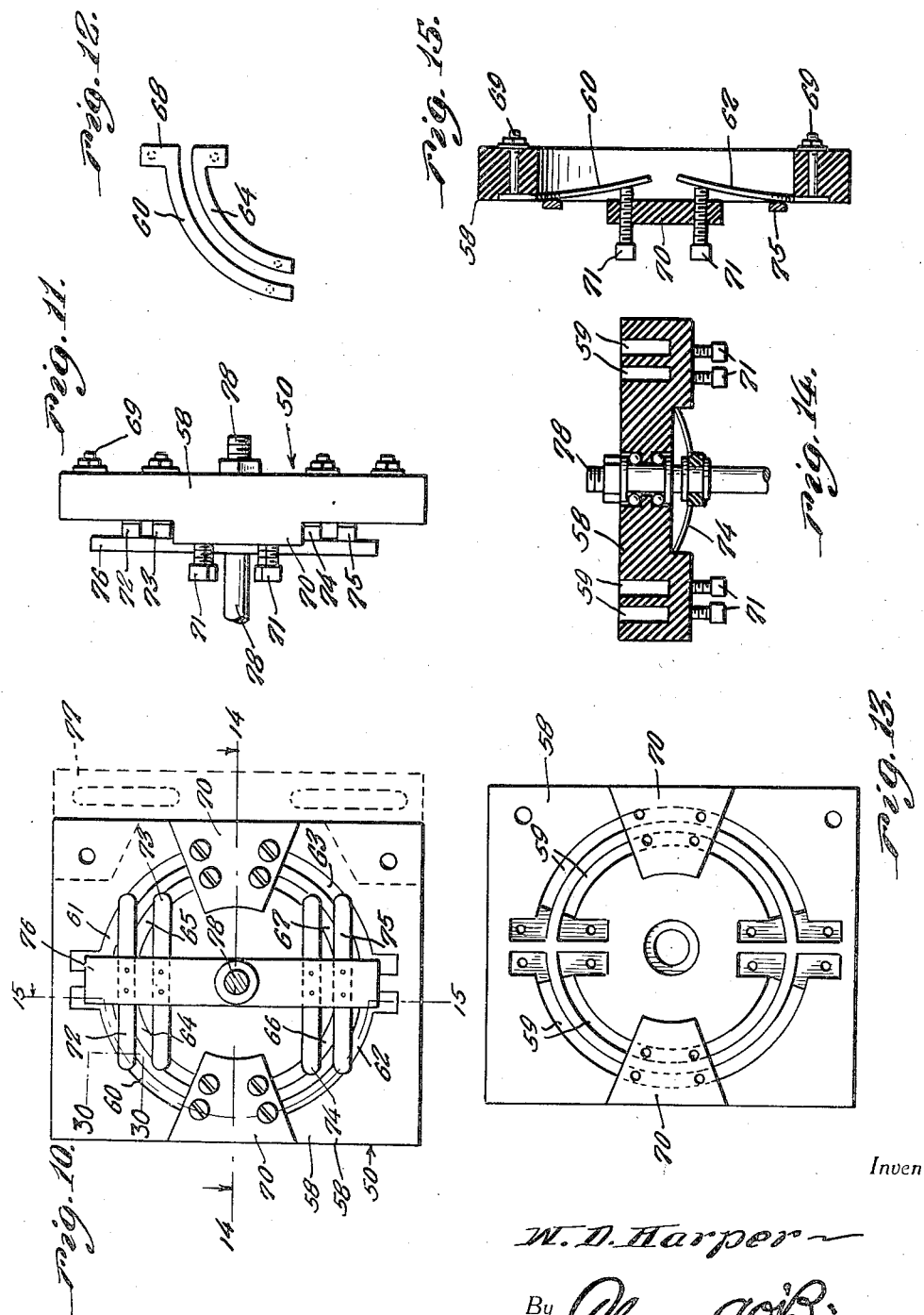

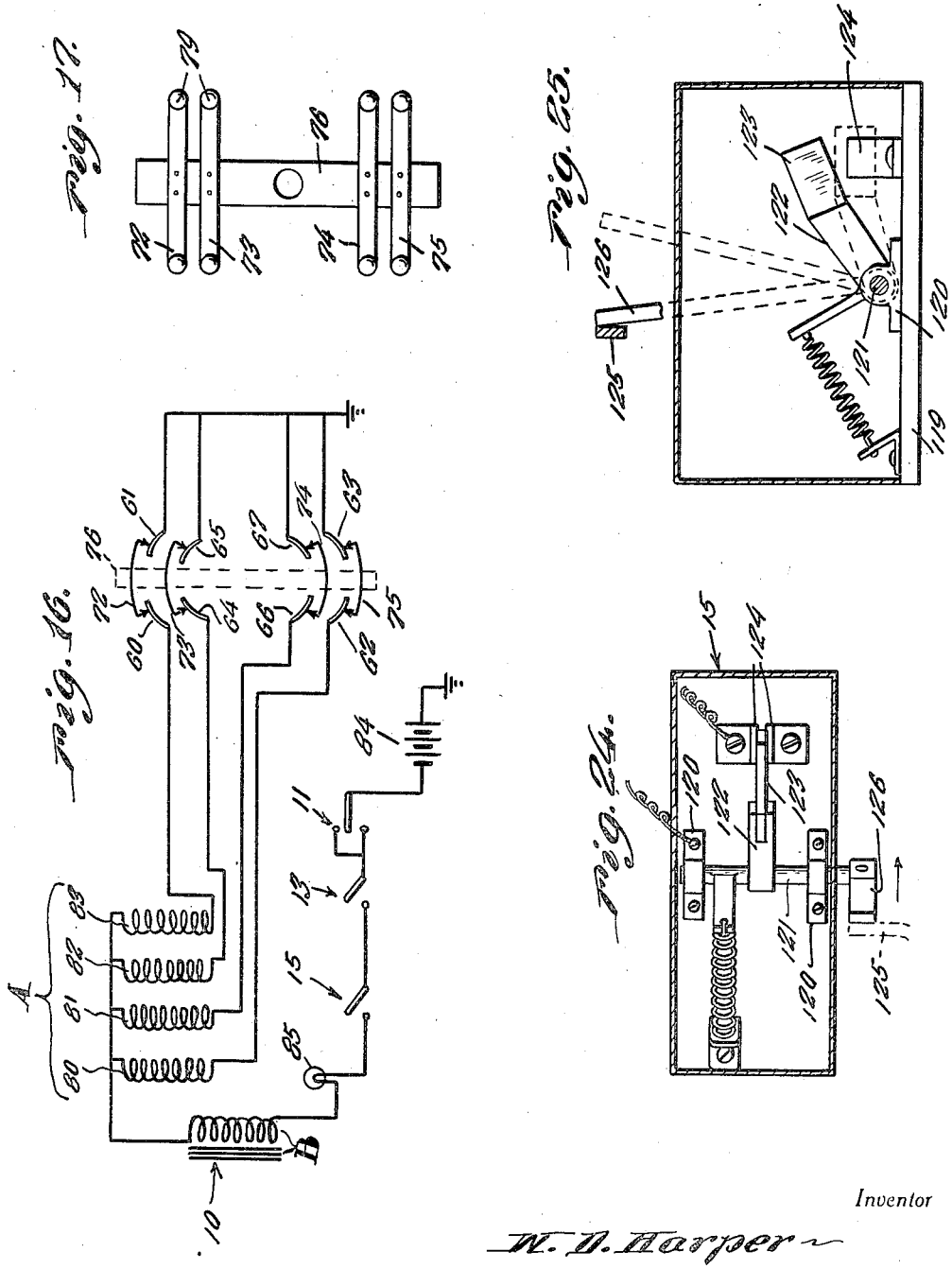

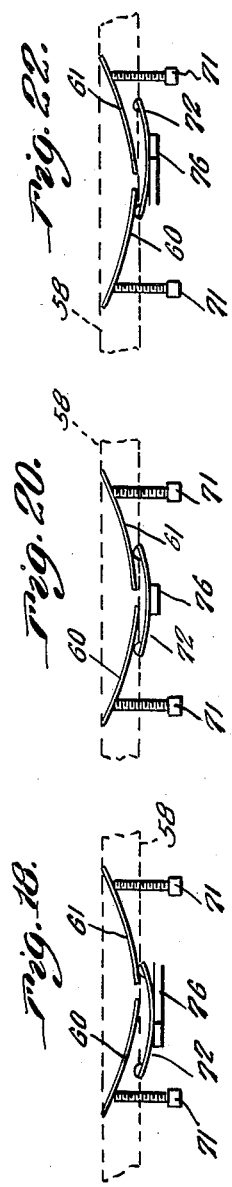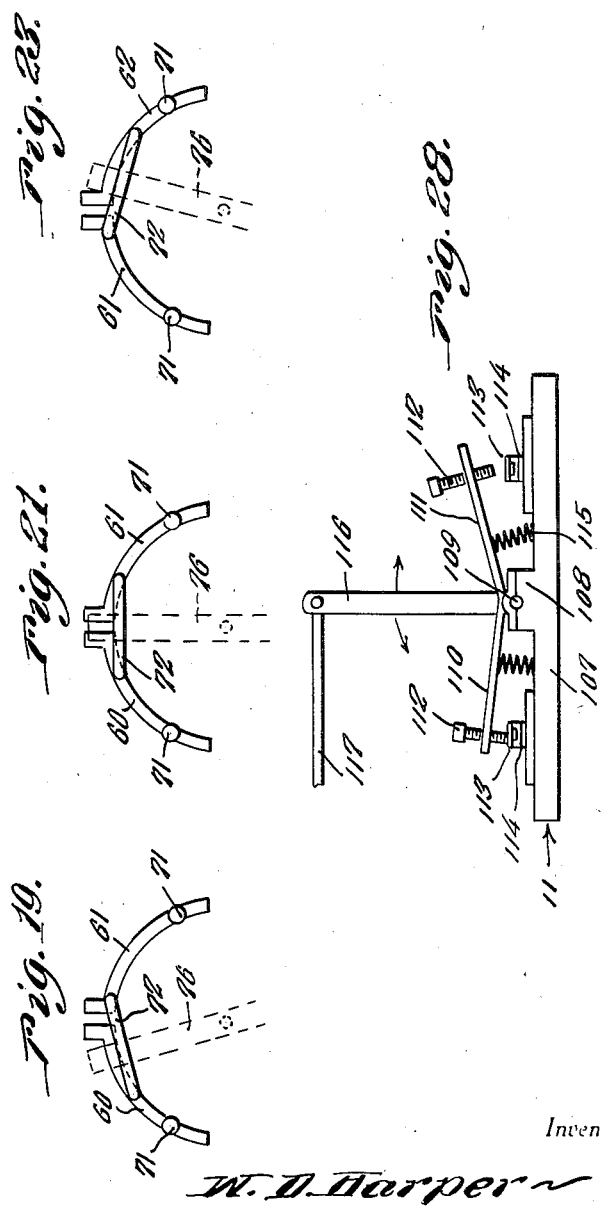

Feb. 8, 1938.　　　W. D. HARPER　　　2,107,984
AUTOMATIC BRAKE OPERATOR
Filed March 28, 1936　　　8 Sheets-Sheet 8
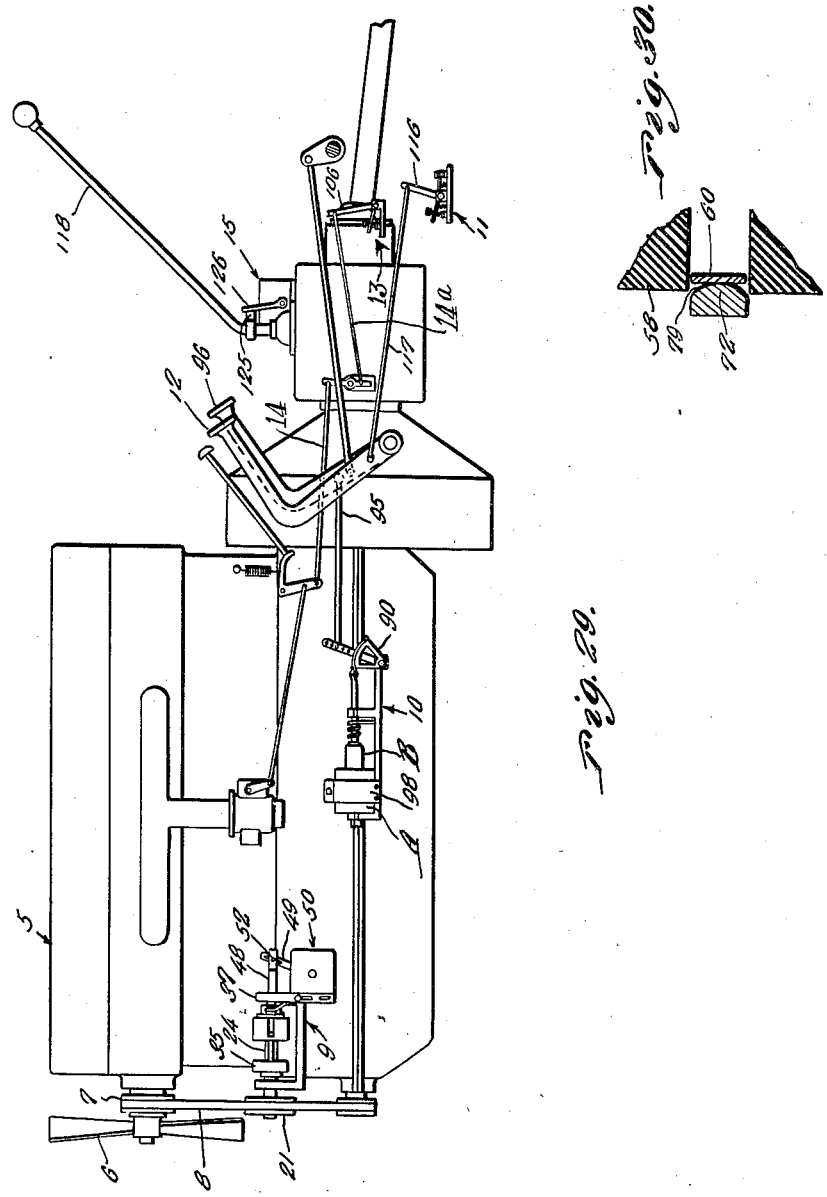
Inventor
W. D. Harper
By Clarence A. O'Brien
Hyman Berman
Attorneys.

Patented Feb. 8, 1938

2,107,984

UNITED STATES PATENT OFFICE 2,107,984

AUTOMATIC BRAKE OPERATOR

Walter Dixon Harper, Florence, S. C.

Application March 28, 1936, Serial No. 71,480

7 Claims. (Cl. 192—3)

This invention relates to new and useful improvements in vehicle brakes and more particularly to an automatic brake operator especially adapted for use on motor vehicles.

The principal object of the present invention is to provide an operator for vehicle brakes wherein operation takes place automatically in response to the usual personal emergency action of the driver.

Another important object of the invention is to provide an automatic braking system for motor vehicles wherein the system is caused to operate in proportion to the deceleration of the vehicle, by use of its moving parts to the end that the brakes will be applied by a gradual application of force and braking will not exceed a predetermined degree, i. e. skidding will be avoided.

Still another important object of the invention is to provide an automatic brake operator of the character stated wherein the requirement for human initiative and presence of mind is entirely eliminated.

Other important objects and advantages of the invention will become apparent to the reader of the following specification.

In the drawings:

Figure 1 represents a top plan view of a vehicle motor showing the elements of the invention associated therewith.

Figure 2 is a side elevational view of the governor.

Figure 3 is an end elevational view of the governor.

Figure 4 is an end elevational view of the rotor of the governor.

Figure 5 is a longitudinal sectional view through the governor.

Figure 6 represents longitudinal sectional views through the spring holder and guide for the governor rotor.

Figure 7 is a side elevational view of the rotor hub structure.

Figure 8 is a top plan view of the solenoid motor.

Figure 9 is a side elevational view of the structure shown in Figure 8.

Figure 10 is a front elevational view of the switch shown associated with the governor in Figure 1.

Figure 11 is a side elevational view of the switch shown in Figure 10.

Figure 12 is an elevational view of the contacts of the switch shown in Figure 10.

Figure 13 is a front elevational view of the switch shown in Figure 10 with the contact and contactors removed.

Figure 14 is a section on line 14—14 of Figure 10.

Figure 15 is a section on line 15—15 of Figure 10.

Figure 16 is a diagram showing the switches of the system and the connections between the same.

Figure 17 is an inside elevational view of the contactor assembly of the switch shown in Figure 10.

Figure 18 is a diagrammatic view showing one contactor of the switch shown in Figure 10 in unbridged position.

Figure 19 is a front elevational view of the structure shown in Figure 18.

Figure 20 shows the contactor moved to bridged position.

Figure 21 is a front elevational view of the structure shown in Figure 20.

Figure 22 is a diagram showing the contactor in excessive deceleration position and unbridged.

Figure 23 is a front elevational view of the structure shown in Figure 22.

Figure 24 is a top plan view of the gear shift lever switch with the casing thereof in horizontal section.

Figure 25 is a vertical sectional view through the switch structure shown in Figure 24.

Figure 26 is a front elevational view of the switch for the accelerator.

Figure 27 is a side elevational view of the switch shown in Figure 26.

Figure 28 is a side elevational view of the switch for the clutch.

Figure 29 is a side elevational view of the engine with associated elements of the present invention.

Figure 30 is a fragmentary sectional view on the line 30—30 of Figure 10.

Referring to the drawings wherein like numerals designate like parts, it can be seen in Figure 1, that numeral 5 generally refers to the usual motor of an automobile with numeral 6 representing the fan thereof and numeral 7 the fan belt pulley. Numeral 8 is the usual fan belt, and while the governor mechanism generally referred to by the numeral 9 can be associated with the drive shaft or some other constantly moving part of the motor, it has been discretionally shown in Figure 5 connected to and driven by the belt 8.

Referring briefly to the other parts of the mechanism, it can be seen that numeral 10 generally refers to the solenoid motor which is directly connected with the usual braking system of the automobile. The switch generally referred to by numeral 11 is connected with the usual clutch pedal 12 while the switch generally referred to by numeral 13 is connected to the usual accelerator button by the rods 14 and 14a.

A fourth switch is generally referred to by numeral 15 and is situated adjacent the gear shift lever where it is maintained closed by the gear shift lever when the same is in high speed position.

Referring now to the governor assembly generally referred to by numeral 9 and shown in Figures 2 to 7 inclusive, it can be seen that numeral 16 is a base plate having the upstanding end walls 17—18. Upon the wall 17 is a bearing structure 19 through which the shaft 20 is journalled. The forward end of this shaft 20 is provided with the pulley wheel 21 over which the fan belt 8 is trained. The rear end of this shaft 20 is journalled in the bearing structure 22 situated upon the walls 18 and a screw 23 serves to stop the thrust of this shaft.

The intermediate portion of the shaft 20 is provided with threads 24. Forwardly of the threads 24, a collar 25 is secured to the shaft as at 26 and this collar 25 is provided with the peripheral flange 27 from the edge portion of which a pin 28 projects laterally and to which one end of the spiral strip spring 29 is secured. A bearing ring 30 provided with the radially disposed plate 31, is also provided with the internal circumferentially disposed rib 32 opposed to the collar 25 for defining a pair of raceways for the ball bearings 33. A retaining ring 34 is threaded on one end of the collar 25 to retain this ball bearing assembly intact.

Numeral 35 is a cylinder which serves as a housing for the spring 29 and thus merges with the disk 31 and is provided with a pair of parallel longitudinally extending arms 36—36 which serve as guides for the governor rotor 37. As is shown in Figure 5, a pin 38 extends inwardly from the disk 31 and to this the inner end of the spring 29 is secured.

The rotor 37 is cylindrical and provided with an axial bore 39 which receives the sleeve extension 40 which extends from the collar 41. This sleeve 40 is provided with longitudinally extending rows of openings 42 in which balls 43 seat and these balls ride in the grooves between the threads 24. As is shown in Figure 5 and also clearly shown in Figure 4, the rotor 37 at diametrically opposite points on its periphery is provided with a pair of longitudinally extending grooves 44. The forward ends of these grooves 44 are bridged as at 45 and as is shown in Figure 5, the arms 36—36 are disposed in these grooves 44 and under the bridges 45. Thus the rotor and spring assembly are interconnected.

A disk 46 is provided on the forward end of the collar 41 and is apertured to receive screws 47 driven into the rotor 37.

A yoke 48 has the arm 49 of the switch generally referred to by numeral 50 pivotally connected thereto. The arm 49 is slotted as at 51 and a bolt 52 extends through the slot 51 and the bight portion of the yoke 48. The end portions of the legs of the yoke are provided with outturned feet 53 which pass in front of the bumper springs 54 supported by the wall 18. The legs of the yoke 48 also carry an annulus 55 which in cooperation with the disk 46 and the nut 56 defines a pair of raceways for the reception of the ball bearings 57.

The switch generally referred to by numeral 50 consists of the block 58 of insulation. In this block 58 is two annular arrangements of slots 59. In these slots are the upper outside contact fingers 60—61 and the lower outside spring contact fingers 62 and 63. Furthermore, there are the upper inside spring contact fingers 64—65, and the lower inside spring contact fingers 66 and 67. Each of these contact fingers is provided with a portion 68 from which extends a binding post 69, the binding post serving to secure the finger in position and extending entirely through the block 58.

Dielectric plates 70 extend over the free end portion of the spring contact fingers and each carries four adjusting screws 71, one screw for each free end of the spring contact fingers.

At this point it should be understood that these spring contact fingers 60 to 67 inclusive are adjusted in varying degrees to accommodate the bridge pieces 72, 73, 74 and 75, carried by the oscillatory member 76 which is of insulation.

The insulation block 58 is mounted in a suitable manner preferably by a bracket 77.

The oscillatory member 76 is secured to the shaft 78 from which the aforementioned arm 49 (see Figure 2) extends.

Figures 18, 20 and 22 as well as Figures 19, 21 and 23 suggest how the upper bridge member 72 (for instance) acts with respect to the upper outside contact fingers 60—61. As is shown in Figure 15, it will be observed that the bridge members actually extend into the grooves 59 only as far as their ball like ends 79 permit and the screws 71 maintain the spring fingers in such tensioned manner as to permit the bridge members 72 to cut in the circuit the field coils 80, 81, 82 and 83 successively and to cut them out successively upon excessive advancement of rotor 37.

As is shown in Figure 16, numeral 84 represents the source of current which extends to the clutch switch 11. The clutch switch 11, the accelerator switch 13 and the gear shift switch 15 are connected in series with the pilot lamp 85 along with the solenoid 10.

The solenoid motor generally referred to by numeral 10 consists of the base 86 provided with the upstanding walls 87—88. The field coils 80, 81, 82, and 83 of the solenoid motor 10 are generally denoted by reference character A in Figure 9 and the wound core by reference character B. An elongated rod extends rearwardly from the core B and through the bearing 88 on the wall 87. A strap 89 extends from the rear end of the rod and connects to the distant end of the rocker 90 as at 91. This rocker 90 is carried by the shaft 92, laterally from which extends the arm 93 which has a plurality of longitudinally spaced openings 94 therein through which securing means can be disposed for securing the connecting rod 95 thereto at its forward end. This connecting rod 95 connects to the usual brake pedal 96 or some other part of the brake mechanism.

The forward end of the core B has a guide rod 96 extending therefrom and through a bearing 97 on the wall 88. A clamp band 98 extending upwardly from the base 86 encompasses and retains the field coils A in place on the base 86.

The accelerator switch generally referred to by numeral 13 and shown in Figures 26 and 27 consists of the base 99 having the bearings 100—100 thereon and through these bearings 100 the shaft 101 is journalled.

On the base 99 is the stationary contact 102 and above this is the spring contact finger 103 against which the screw 104 on the arm 105 normally engages. This arm 105 projects laterally from the shaft 101. An upstanding arm 106 on the shaft 101 is connected by the aforementioned rod 14 to the usual accelerator button or some other part of the accelerator line, so that when the accelerator is released, the rod 14 will be pulled in such a manner as to swing the rod 105 downwardly and engage the contact finger 103 with the contact 102. The clutch switch generally referred to by numeral 11 and shown in Figure 28 consists of the base 107 having bearing structures 108 thereon through which the shaft 109 is journalled. A pair of arms 110—111 extend laterally from the shaft 109 in opposite directions and each carries a screw 112 disposed over a corresponding spring contact finger 113 which normally overlies in spaced relation a fixed contact 114 on the base 107. A coiled compressible spring 115 is interposed between each of these arms 110—111 and the base 107. An arm 116 extends upwardly from the shaft 109 and is connected by the connecting rod 117 to the usual clutch pedal 112. It can be seen that when the clutch pedal is in complete clutch engaged position, the contacts 113—114 to the left in Figure 28 are engaged. When the clutch pedal is pushed all the way in that is when the clutch is disengaged, the contacts 113—114 to the right in Figure 28 will be engaged. The clutch pedal will have freedom between these two extreme points where the driver can clutch the motor if he desires without affecting this brake operator mechanism.

Figures 24 and 25 disclose the switch for the gear shift lever 118. This switch which is generally referred to by numeral 15 includes a base 119 upon which are the bearings 120 through which the shaft 121 is journalled. The shaft 121 has a dielectric block 122 thereon from which extends the switch blade 123 engageable between the contacts 124, when the shaft 121 is rocked by the lug 125 on the gear shift lever 118 pressing against the upstanding arm 126 on the shaft 121. This occurs when the gear shift lever 118 is moved to high speed position.

It can now be seen, that the object of the invention is to cause the brake mechanism of the vehicle to automatically operate when some emergency action of the driver occurs. For instance, with the motor of a vehicle which is denoted by numeral 5 operating at moderate speed, the governor member 37 is somewhat to the right, that is about midway of the threaded portion 24 of the shaft 20 and in this position the bridge member 72 of the switch 50 is bridging the upper contacts 60—61 as shown in Figure 20. Furthermore, because the clutch is engaged, the clutch pedal is maintaining the contacts 113—114 to the left in Figure 28 engaged, and because the car is operating in high gear, the gear shift lever 118 is maintaining the switch 15 closed. However, because the accelerator is being operated, the switch 13 is open. As is shown in the diagrammatic view of Figure 16 all the switches are in series and the solenoid motor 10 cannot operate until all of the same are closed. Consequently, in an emergency, the driver instinctively removes his foot from the accelerator and this automatically results in closing of the switch 13 and the establishment of a complete circuit throughout the entire system. The shaft 20 of the governor mechanism maintains the rotor 37 toward the rear end of the shaft when the engine is operating due to the screw connection of the shaft with the rotor 37. However, when the shaft 20 slows down in rotation, when acceleration of the engine ceases, the spring 29 of the governor will untension itself and simultaneously cause a forward feeding of the rotor 37 on the shaft 20, resulting in the operation of the switch 50. As the governor member 37 begins to move on the screw 24, the bridge members 72 to 75 are successively brought into bridging engagement with their corresponding contacts 60 to 67 inclusive so as to successively cut in the field windings 80, 81, 82 and 83 to gradually increase the strength of the solenoid motor 10 in direct proportion to the deceleration of the motor 5. The governor with switch 50 is so designed that the field windings 80, 81, 82, and 83, will be successively opened by a further advancement of rotor 37 should the braking effect of the mechanism become excessive. This opening of the field windings by switch 50 of the governor will decrease the power of the motor 10 so as to lessen the braking effect and consequently give a balanced system which will maintain a practically constant braking action once the maximum desired braking force has been obtained. Thus overbraking above a predetermined degree is entirely avoided. Kindly refer to Figures 18 through 23 for a detailed description of the action of switch 50. It will be noticed that Figures 18 and 19 illustrate one pair of contacts at an instant when braking has not reached a maximum. Figures 20 and 21 indicate the position of one pair of contacts at the instant of maximum braking action. From Figures 22 and 23 it will be seen that further rotation of the contacts of switch 50 by additional advancement of rotor 37 (due of course to deceleration) will break the contact (bridgement) and open one or more of the field windings to motor 10, reducing the force on the brakes and thus preventing a maintenance of excessive braking force. This releasing action is highly important, as it is through this effect of the governor that the system is made independent of the condition or efficiency of the conventional braking mechanism of the vehicle.

While the foregoing specification sets forth the invention in specific terms, it is to be understood that numerous changes in the shape, size and materials may be resorted to without departing from the spirit or scope of the invention as claimed hereinafter.

Having thus described the invention, what is claimed as new is:

1. In combination with a motor of a motor vehicle, a brake mechanism, a governor operated by said motor, a switch controlled by the governor, an electric motor for operating said brake mechanism, a source of current, said switch and electric motor being connected electrically with said source of current, and an accelerator operated switch between said source of current and the electric motor adapted to be closed when the accelerator is in inoperative position.

2. In combination with a motor of a motor vehicle, a brake mechanism, a governor operated by said motor, a switch controlled by the governor, an electric motor for operating said brake mechanism, a source of current, said switch and electric motor being connected electrically with said source of current, an accelerator operated switch between said source of current and the electric motor adapted to be closed when the accelerator is in inoperative position, and said electric motor being in the form of a solenoid having a movable core for operating the said brake mechanism.

3. In combination with a motor of a motor vehicle, a brake mechanism, a governor operated by said motor, a switch controlled by the governor, an electric motor for operating said brake mechanism, a source of current, said switch and electric motor being connected electrically with said source of current, an accelerator operated switch between said source of current and the electric motor adapted to be closed when the accelerator is in inoperative position, said electric motor being in the form of a solenoid having a movable core for operating the said brake mechanism, said solenoid being provided with a plurality of field coils adapted to be progressively cut in by the said motor operated switch.

4. In combination with a motor of a motor vehicle, a brake mechanism, a governor operated by said motor, a switch controlled by the governor, an electric motor for operating said brake mechanism, a source of current, said switch and electric motor being connected electrically with said source of current, an accelerator operated switch between said source of current and the electric motor adapted to be closed when the accelerator is in inoperative position, said governor being connected with the usual fan drive of the motor of the motor vehicle.

5. In combination with a motor of a motor vehicle, a brake mechanism, a governor operated by said motor, a switch controlled by the governor, an electric motor for operating said brake mechanism, a source of current, said switch and electric motor being connected electrically with said source of current, an accelerator operated switch between said source of current and the electric motor adapted to be closed when the accelerator is in inoperative position, and a gear shift lever operated switch interposed between the accelerator operated switch and the source of current and adapted to be maintained closed when the gear shift lever is in high gear position.

6. In combination with a motor of a motor vehicle, a brake mechanism, a governor operated by said motor, a switch controlled by the governor, an electric motor for operating said brake mechanism, a source of current, said switch and electric motor being connected electrically with said source of current, an accelerator operated switch between said source of current and the electric motor adapted to be closed when the accelerator is in inoperative position, and a gear shift lever operated switch interposed between the source of current and the electric motor, said gear shift lever operated switch being adapted to be maintained closed when the gear shift lever is in high gear position.

7. In combination with a motor of a motor vehicle, a brake mechanism, a governor operated by said motor, a switch controlled by the governor, an electric motor for operating said brake mechanism, a source of current, said switch and electric motor being connected electrically with said source of current, an accelerator operated switch between said source of current and the electric motor adapted to be closed when the accelerator is in inoperative position, and a clutch pedal operated switch interposed between the source of current and the said electric motor, said clutch pedal operated switch being adapted to be closed when said pedal is in either extreme position of its range of movement.

WALTER DIXON HARPER.